Feb. 23, 1960

J. E. LILIENFELD 2,926,109

ELECTRODE FOR ELECTROLYTIC CAPACITOR
AND METHODS OF INSULATING THE SAME

Filed July 7, 1954

INVENTOR.
JULIUS EDGAR LILIENFELD
BY

ATTORNEYS.

2,926,109

ELECTRODE FOR ELECTROLYTIC CAPACITOR AND METHODS OF INSULATING THE SAME

Julius Edgar Lilienfeld, St. Thomas, Virgin Islands, assignor to Samuel E. Warren, Essex, Mass., and Ralph F. Burkhard, Arlington, Mass.

Application July 7, 1954, Serial No. 441,780

8 Claims. (Cl. 117—232)

The invention relates to electrolytic capacitors, suitable both for operation with filter circuits and with alternating voltages. More specifically, the invention relates to an electrolytic capacitor of the narrow-spaced, generally coiled electrode type designed for operation with a freely flowing electrolyte, and particularly to the means for separating the adjacent coils from one another.

The invention has for an object to provide an effective miniaturized capacitor without forfeiting the advantages of being able to make use of materials of relatively low cost; also, to provide a capacitor of this nature having the desirable characteristic of being only insignificantly affected, over a wide range, by the effect of ambient temperatures.

Another object of the invention is to replace the conventional individual separator member of a capacitor by integrating with an electrode thereof the required separator material as a novel well-adherent, coherent and permeable coating.

Still another object of the invention is to obviate spillage of electrolyte and thus, in effect, to make the capacitor perform similarly to a conventionally termed "dry" type of capacitor.

A further object of the invention is to provide a novel insulating coating for one or both of the electrodes and a novel mode of producing such a coating.

A still further object of the invention is to convey in a novel manner the electrolyte to one or both of the electrodes.

In carrying out the invention, the capacitor—either of the polarized or nonpolarized type and with either plate or coiled electrodes—has the cathode or both cathode and anode or anodes directly coated with a novel separator material. Such material is provided as of a highly porous or permeable nature and consists of a polymerized organic compound insoluble in the electrolyte. The material, also, is of a wettability substantially lower than that of the anodized electrode; for example, it may consist of a polymerized organic plastic (polyethylene) such as is set forth in my copending application for U.S. Letters Patent, Serial No. 382,536; or of a dispersion of silicone rubber known as "Silastic."

The electrolyte with which my improved electrode is advantageously used is a substantially anhydrous, free-flowing liquid comprising three components, to wit: a substantially insulating, nonhydrionizable (i.e., having a conductivity low enough to classify as insulator and when mixed with water still retaining this classification) organic liquid solvent means and a solute consisting of a weak organic acid component and a minor quantity of an alkali base component. An electrolyte of this nature is described more particularly in my U.S. Letters Patent No. 2,826,724, dated March 11, 1958.

In accordance with the invention, the insulating medium is integrated with one or both electrodes as a coherent, well-adhering and porous coating pervious to the electrolyte, as by spray-depositing a dispersion of the medium thereon; or by applying it in any suitable manner to produce a pervious coating, as described in my application Ser. No. 382,536, for example.

The nature of the invention, however, will best be understood when described in connection with the accompanying drawings, in which.

In all of the views, the separation of the electrodes, as well as the dimensions of the electrodes themselves, has been shown on an exaggerated scale for the sake of clearness.

Figure 1:
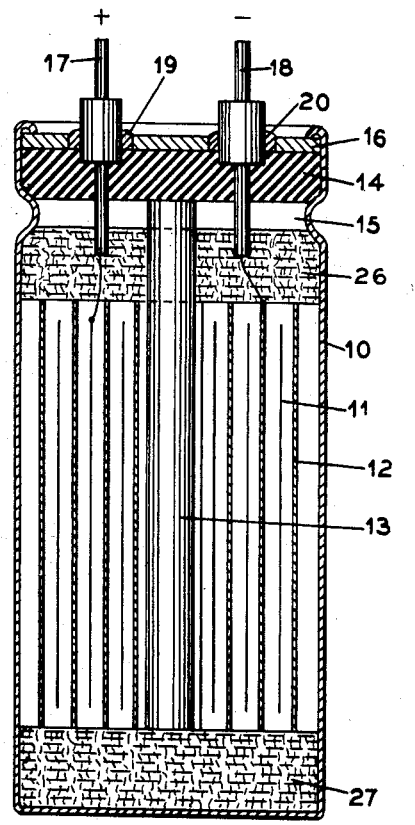
Fig. 1 shows the novel capacitor in vertical section.
Figure 2:
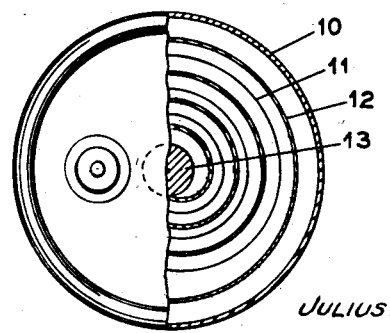
Fig. 2 is a plan view thereof with portion in horizontal section.

Referring to the drawings, more particularly Figs. 1 and 2, a suitable receptacle or can 10 is provided to house the electrodes 11 and 12, the former being the anodic element and the latter the cathodic element, and the capacitor being shown, for the sake of simplicity, as of the polarized type.

In the particular embodiment shown, these electrodes are coiled in the conventional manner about a mandrel 13, and the coil located in the can. The mandrel at its upper end is positioned in the insulating closure block 14 supported on the circumferentially inturned ledge 15 of the can. Block 14 is covered with a metal plate 16 over which the upper edge of the can is crimped. Terminal members 17 and 18, respectively connected with the anode and cathode, extend outwardly through the block 14 and openings 19 and 20, respectively, of the cover plate.

Figure 3:
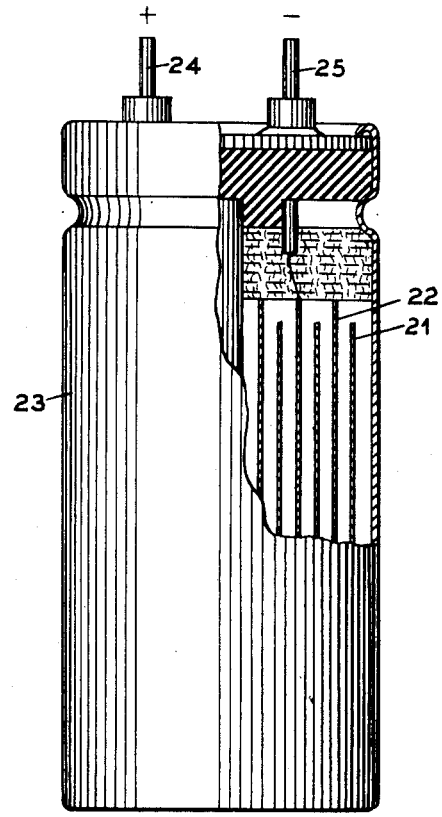
Fig. 3 is an elevational view of the capacitor, with portion of the can broken away to disclose a modification in the electrode coating arrangement.

The invention contemplates the elimination of a separator member of insulating and porous material which is independent of the electrodes; and to this end provision is made whereby the necessary insulation is secured by integrating with the cathode 12 a suitable insulating material in a highly porous coating, the cathodic unit being indicated in Fig. 1 by a heavier lining than that for the uncoated filmed anode 11. However, the anode 21, Fig. 3, may also be thus coated along with the cathode 22. The electrode assembly is then located in the can 23, and the electrodes are connected to the respective terminals 24, 25.

To effect the aforesaid integration, I make use of the property of polyethylene of being soluble in organic solvents such as ketones higher than acetone. I have, however, discovered that it is necessary for the purpose not to use ketones of a very high order of molecular weight, not much higher than, for instance, methyl isobutyl ketone, because of the tendency of such higher ketones toward coalescing the coating and thus producing too little porosity and so too high a resistance, resulting in high power loss in the condenser. To secure the desired porosity and so dispersion of the polyethylene, I use, preferably, a high molecular weight polyethylene and dissolve it in said ketone by conventional means so as to obtain at the boiling point a clear saturated solution. This is then cooled to ambient or lower temperature to obtain a fine, copious dispersion of the polyethylene in it. This dispersion may then be concentrated by conventional means to obtain a consistency adequate to produce a coating, as by a settling-out or centrifuging operation, care being exercised in the latter case not to use a high velocity in order to avoid loss of porosity.

If the so-obtained dispersion is applied to an electrode surface, whether anodized or not, for example by spraying it thereon or by painting or brushing the dispersion thereover, or by immersing an electrode in the dispersion, and then drying it, preferably at a temperature moderately higher than the ambient temperature, there will be produced a well-adhering, coherent and extremely porous coating of minute interstices. Such coating is highly pervious to the aforesaid nonaqueous electrolytes and displays to an adequate degree capillary attraction to nonaqueous electrolytes, such as used for the solvents acetone and methyl ethyl ketone.

In many cases it is advisable to heat the initially coated electrolyte in order to dry the coating to a temperature not substantially exceeding 55° C., the latter limitation because higher heating would cause the coating material to coalesce and reduce its porosity.

It is preferred to effect formation of the anodic film in a substantially anhydrous electrolyte, of the nature set forth in the aforesaid patent, inasmuch as the capillary attraction of the polyethylene to the anhydrous electrolyte is much less than that of the anodized film. This relation between the two attractions maintains the film in intimate contact with the electrolyte and so warrants low resistance and operation of the capacitor with small power loss. Thus, the electrolyte may consist of a ketone as a solvent and an organic acid with a minor addition of alkali as solute. For example, an electrolyte consisting of acetone, phenol and sodium has been found to produce most excellent results both for forming the anode therein and for functioning as the capacitor electrolyte, as is set forth in the aforesaid patent.

Although the electrolyte, in accordance with the invention, is present within the can 10 in a free-flowing state, there is no free electrolyte within the receptacle when the capacitor is assembled and ready for use, eliminating spillage. This is effected by absorbent members 26, 27 which are located over the opposite edges of the electrode assembly and may comprise pads of cotton, tissue paper, filter paper, loose porous fabric, fine fibrous polyehtylene or porous polyethylene which are saturated with the electrolyte and arranged to contact said electrode assembly. The embodiment illustrated, moreover, presents a modification from the conventional arrangement in that the coated cathodic electrode 12 extends at both ends beyond its associated anodic electrode. It is designed to contact along these protruding edges the aforesaid respective absorbent members; and through capillary action within the highly permeable coating of the contacting electrode, the electrolyte is caused to permeate said coating throughout and thus to afford conduction between associated electrodes.

No claim is made herein to the capacitor apart from the coated electrode per se and the method of producing such coating as hereinafter set forth.

I claim:

1. An electrode for an electrolytic capacitor of the type incorporating a liquid electrolyte, said electrode having an anodic film and a highly porous insulating coating therefor consisting essentially of a polymerized organic compound of high specific electrical resistance and of a wettability by the electrolyte substantially lower than that of the anodic film of the anodized electrode.

2. An electrode for an electrolytic capacitor: as set forth in claim 1 having a highly porous coating comprising finely-dispersed polyethylene.

3. The method of preparing a medium to provide an insulating pervious surface coating for an electrode for use in an electrolytic capacitor, which comprises: preparing a fluid mixture of high-molecular-weight polyethylene by dissolving the same to a clear saturated solution in a ketone higher than acetone and heated substantially to its boiling point; cooling the solution to room temperature to produce a copious, fine dispersion of the polyethylene of suitable consistency; and applying the dispersion to the electrode to form an adherent coating of the porosity desired.

4. The method according to claim 3, wherein the polyethylene is dissolved in methyl isobutyl ketone.

5. The method according to claim 3, wherein the dispersion is applied over the electrode surface, and the electrode thus coated is then subjected to a moderately elevated temperature until the coating is dry and pervious.

6. The method according to claim 5, wherein the dispersion is applied to the electrode by spraying the electrode surface therewith.

7. The method according to claim 5, wherein the dispersion is applied to the electrode by brushing it over the electrode surface.

8. The method according to claim 5, wherein the dispersion is applied to the electrode by immersing the active surface of the electrode in the concentrated dispersion for a brief period.

References Cited in the file of this patent

UNITED STATES PATENTS

| | | |
|---|---|---|
| 1,744,302 | Engle | Jan. 21, 1930 |
| 2,104,019 | Brennan | Jan. 4, 1938 |
| 2,141,126 | Doolittle | Dec. 20, 1938 |
| 2,229,431 | Young | Jan. 21, 1941 |
| 2,406,039 | Roedel | Aug. 20, 1946 |
| 2,492,166 | Marco | Dec. 27, 1949 |
| 2,562,117 | Osdal | July 24, 1951 |
| 2,602,073 | Kropa | July 1, 1952 |
| 2,646,414 | Gillespie | July 21, 1953 |
| 2,663,652 | Railing | Dec. 22, 1953 |

UNITED STATES PATENT OFFICE
CERTIFICATION OF CORRECTION

Patent No. 2,926,109                          February 23, 1960

Julius Edgar Lilienfeld

It is hereby certified that error appears in the above numbered patent requiring correction and that the said Letters Patent should read as corrected below.

In the grant, lines 2 and 3, for "assignor to Samuel E. Warren, of Essex, Massachusetts, and Ralph F. Burkhard, of Arlington, Massachusetts," read -- assignor to Samuel D. Warren, of Essex, Massachusetts, and Ralph F. Burkard, of Arlington, Massachusetts, --; line 12, for "Samuel E. Warren and Ralph F. Burkhard, their heirs" read -- Samuel D. Warren and Ralph F. Burkard, their heirs --; in the heading to the printed specification, lines 4, 5, and 6, for "assignor to Samuel E. Warren, Essex, Mass., and Ralph F. Burkhard, Arlington, Mass." read -- assignor to Samuel D. Warren, Essex, Mass., and Ralph F. Burkard, Arlington, Mass. --.

Signed and sealed this 18th day of April 1961.

(SEAL)
Attest:

ERNEST W. SWIDER
Attesting Officer

DAVID L. LADD
Commissioner of Patents